United States Patent Office 3,547,859
Patented Dec. 15, 1970

3,547,859
VINYL FLUORIDE COPOLYMER
Yutaka Kometani, Nishinomiya-shi, Tsuneo Fujii, Suita-shi, and Shinsuke Sakata, Settsu-shi, Japan, assignors to Daikin Kogyo Co., Ltd., Osaka, Japan
Filed May 8, 1968, Ser. No. 727,631
Claims priority, application Japan, May 12, 1967, 42/29,754, 42/29,755
Int. Cl. C08f 15/06
U.S. Cl. 260—87.5
1 Claim

ABSTRACT OF THE DISCLOSURE

A vinyl fluoride copolymer which has a larger difference between the melting temperature and the decomposition temperature than that of poly (vinyl fluoride), produced by polymerizing in the presence of a free radical initiator 30–99 mol percent of vinyl fluoride and 70–1 mol percent of a monomer expressed by the general formula $$CF_2=CHX$$

Figure 1:
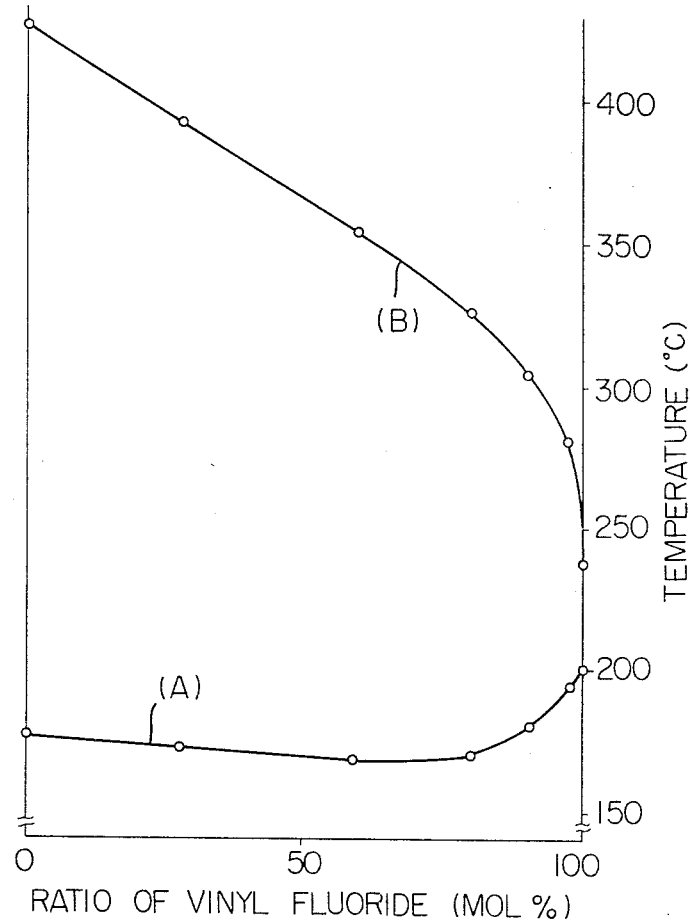

wherein X represents a hydrogen atom or fluorine atom, the ratio of the monomer unit of the above formula in the resulting copolymer being 1–50 mol percent.

---

This invention relates to a process for the production of vinyl fluoride copolymers, and more particularly to a process for the production of copolymers of vinyl fluoride which have a larger difference between the melting temperature and the decomposition temperature than that of poly (vinyl fluoride).

Poly (vinyl fluoride) has a remarkably excellent weatherability as compared with other synthetic resins, and is provided also with other desirable properties such as flexibility, strength and transparency. Hence, there has been an increasing demand in recent years for this polymer as films or coating materials.

The poly (vinyl fluoride), however, has a defect that it is inferior in thermal properties. This polymer begins to be decomposed at a temperature in the vicinity of 200° C., which is its melting point, and is rapidly decomposed with the passage of time and the rise of temperature, with the result that the quality becomes deteriorated. When the temperature exceeds a certain limit, the polymer is completely decomposed (the temperature at this time may hereinafter be called the decomposition temperature). That the decomposition temperature is very close to the melting temperature in poly (vinyl fluoride), that is, the decomposition temperature is only 30–40° C. higher than the melting temperature, is a severe restriction on the application of this polymer. When poly (vinyl fluoride) is heated, a normally transparent polymer first turns yellow, brown, and then gradually dark, until it is carbonized. When, therefore, poly (vinyl fluoride) is melted by heating to a temperature above its melting point and melt-extruded by an ordinary extrusion or injection process, it almost necessarily happens that a resulting shaped article is colored. What is worse, it is very difficult, and practically impossible, to obtain a colorless shaped article from poly (vinyl fluoride). Furthermore, poly (vinyl fluoride) exhibits almost no affinity for an ordinary solvent whether at room temperature or at high temperatures, and involves various disadvantages in using it as a coating material.

Proposals have been made to improve these thermal properties of poly (vinyl fluoride) by adding various heat-stabilizers to it, but they have only resulted in the prevention of coloring of the polymer at high temperatures, and do not basically solve the problems encountered in a molten state.

According to another proposal of improvement, the melting temperature of poly (vinyl fluoride) is lowered by adding to it a latent solvent, that is, an organic solvent which does not apparently act on the poly (vinyl fluoride) at room temperature, whereby the poly (vinyl fluoride) is shaped without involving any decomposition. In order to remove the solvent easily from a shaped article without making its distortion excessively large, it is necessary to make the size of one dimension of the shaped article extremely small, and therefore, it is impossible to produce a shaped article having a substantially three-dimensional thickness.

Accordingly, an object of this invention is to improve the above-mentioned thermal properties of poly (vinyl fluoride) basically, and to provide a vinyl fluoride resin capable of being shaped into a useful article by a melt-extrusion method. Another object of the invention is to provide a poly (vinyl fluoride) resin which can give a useful coating solution by increasing its affinity for an ordinary solvent.

The objects of the invention can be achieved by polymerzing in the presence of a free radical initiator 30–99 mol percent of vinyl fluoride and 70–1 mol percent of a monomer having the general formula $$CF_2=CHX \qquad (1)$$

wherein X is a hydrogen atom or fluorine atom, to thereby obtain a copolymer in which the monomer unit of Formula 1 accounts for 1–50 mol percent.

If X in the above Formula 1 is a hydrogen atom, the formula represents vinylidene fluoride. When a vinyl fluoride/vinylidene fluoride copolymer is to be obtained, it is preferable that 30–95 mol percent of vinyl fluoride should be polymerized in the presence of 70–5 mol percent of vinylidene fluoride to thereby form a vinyl fluoride/vinylidene fluoride copolymer consisting predominantly of vinyl fluoride containing about 1–30 mol percent of vinylidene fluoride. As vinylidene fluoride is lower in reactivity than vinyl fluoride, the ratio of vinylidene fluoride in the obtained vinyl fluoride/vinylidene fluoride copolymer is smaller than that of the vinylidene fluoride initially charged.

The obtained vinyl fluoride copolymer consisting predominantly of vinyl fluoride is remarkably improved in decomposition temperature as compared with a vinyl fluoride homopolymer, only by containing as small as about 1 mol percent of vinylidene fluoride. As a result, a difference between the melting temperature and the decomposition temperature is markedly enlarged, and various shaping methods by melt-extrusion have become applicable to this copolymer of the invention, despite that it has been almost impossible to apply them to a homopolymer of vinyl fluoride.

When X in the above Formula 1 is a fluorine atom, the Formula 1 represents trifluoroethylene. When a vinyl fluoride/trifluoroethylene copolymer is to be obtained, it is preferable that 50–99 mol percent of vinyl fluoride is polymerized in the presence of 50–1 mol percent of trifluoroethylene to thereby form a vinyl fluoride/trifluoroethylene copolymer consisting predominantly of vinyl fluoride and containing about 1–50 mol percent of trifluoroethylene.

The obtained vinyl fluoride copolymer consisting predominantly of vinyl fluoride is remarkably improved in decomposition temperature as compared with a vinyl fluoride homopolymer, only by containing as small as about 1 mol percent of trifluoroethylene. Thus, various shaping methods by melt-extrusion have become applicable to this copolymer, while they have been hardly applicable to a homopolymer of vinyl fluoride.

Figure 2:
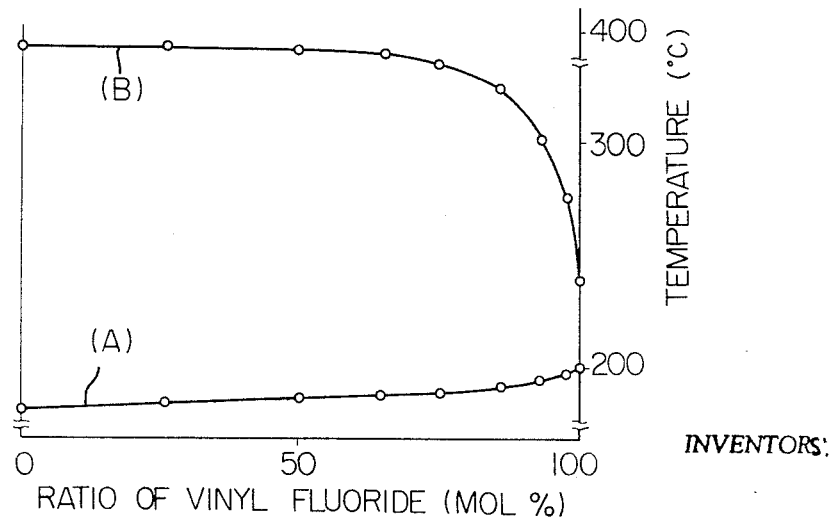

Now, the invention will be described with reference to the accompanying drawings in which:

FIG. 1 is a graph showing the changes of melting temperature and decomposition temperature relative to the changes in the ratios of components of a vinyl fluoride/vinylidene fluoride copolymer; and, FIG. 2 is a graph showing the changes of melting temperature and decomposition temperature relative to the changes in the ratios of components of a vinyl fluoride/trifluoroethylene copolymer.

In the drawings, curve (A) represents the melting temperature, and curve (B), the decomposition temperature. FIG. 1 shows that a vinyl fluoride homopolymer has a melting temperature of about 200° C. and a decomposition temperature of about 240° C., indicating a close proximity. When, however, as small as about 1–2 mol percent of vinylidene fluoride is copolymerized with vinyl fluoride, the decomposition temperature of a resulting copolymer abruptly rises, and a difference between the melting temperature and the decomposition temperature is enlarged to an extent sufficient to apply various shaping methods by melt-extrusion. It is generally known that the decomposition temperature of poly (vinylidene fluoride) is much higher than that of poly (vinyl fluoride). It cannot however be expected at all that when a very small ratio of vinylidene fluoride is copolymerized with vinyl fluoride, the decomposition temperature of a resulting copolymer would vary so remarkably. FIG. 1 shows that the decomposition temperature of the copolymer rises abruptly until the ratio of vinylidene fluoride reaches about 20 mol percent, and thereafter comes near the decomposition temperature (about 410° C.) of poly (vinylidene fluoride) relatively gradually.

Vinylidene fluoride is much lower in reactivity than vinyl fluoride, and therefore, it is difficult to copolymerize a high ratio of vinylidene fluoride in the preparation of a vinyl fluoride/vinylidene fluoride copolymer. An attempt to obtain a vinyl fluoride/vinylidene fluoride copolymer containing more than 30 mol percent of vinylidene fluoride makes it necessary to use a great quantity of a reaction initiator, and this leads to the lowering of the molecular weight of a resulting copolymer. The resulting copolymer, therefore, is deteriorated in weather-ability and tenaciousness which are inherent to poly (vinyl fluoride). If the molecular weight is to be maintained at a certain level in this case, the reaction conditions should be severe, and in particular, the reaction pressure should be elevated. At any rate, there is no commercial value in copolymerizing more than about 30 mol percent of vinylidene fluoride with vinyl fluoride. Moreover, since vinylidene fluoride is more expensive than vinyl fluoride, it is preferable that the ratio of vinylidene fluoride to be copolymerized with vinyl fluoride should be as small as possible within the range where the above-mentioned defects of poly (vinyl fluoride) may be removed. For these reasons, the ratio of vinylidene fluoride in the copolymer of the invention is not more than 30 mol percent, preferably 3 to 20 mol percent. To obtain a copolymer within this preferable range, 40–90 mol percent of vinyl fluoride is polymerized in the presence of 60–10 mol percent of vinylidene fluoride.

This is explained by FIG. 2 which shows the changes of the melting temperature and decomposition temperature relative to the changes of ratio of components of the vinyl fluoride/trifluoroethylene copolymer. In FIG. 2, curve (A) represents the melting temperature, and curve (B), the decomposition temperature. According to this figure, a homopolymer of vinyl fluoride has a melting temperature of about 200° C., and the decomposition temperature of about 240° C., showing a close proximity. When, however, as small as about 1–2 mol percent of trifluoroethylene is copolymerized with vinyl fluoride, the decomposition temperature of a resulting copolymer abruptly rises, and a difference between the melting temperature and the decomposition temperature becomes large enough to make various shaping methods by melt-extrusion applicable. It is generally known that the decomposition temperature of polytrifluoroethylene is much higher than that of poly (vinyl fluoride). It cannot however be expected at all that when a very small ratio of trifluoroethylene is copolymerized with vinyl fluoride, the decomposition temperature of a resulting copolymer would vary so remarkably as in the case of a vinyl fluoride/vinylidene fluoride copolymer. FIG. 2 shows that the decomposition temperature of the copolymer rises abruptly until the ratio of trifluoroethylene reaches about 20 mol percent, and thereafter comes near the decomposition temperature (about 340° C.) of polytrifluoroethylene relatively gradually. When the ratio reaches about 50 mol percent, it corresponds with the decomposition temperature of polytrifluoroethylene. It is thus seen from FIG. 2 that the copolymerization of more than 50 mol percent of trifluoroethylene does not result in any further improvement of thermal properties of the resulting copolymer.

Furthermore, since trifluoroethylene is more expensive than vinyl fluoride, it is preferable that the ratio of trifluoroethylene to be copolymerized with vinyl fluoride should be as small as possible within the range where the above-mentioned defects of poly (vinyl fluoride) may be removed.

For these reasons, the ratio of trifluoroethylene in the copolymer of the invention is not more than 50 mol percent, preferably 10 to 30 mol percent. To obtain a copolymer within this preferable range, 90–70 mol percent of vinyl fluoride is polymerized in the presence of 10–30 mol percent trifluoroethylene.

The copolymers obtained in accordance with the invention are further characterized by having a remarkably improved affinity with a solvent as compared with a homopolymer of vinyl fluoride, and being soluble in various solvents. It is known that a homopolymer of vinyl fluoride is not soluble in any solvent at room temperature, and even if heated, it hardly exhibits an affinity with solvents. It should be noted however that the vinyl fluoride copolymers obtained in accordance with the process of the invention are readily soluble in ordinary organic solvents such as γ-butyrolactone, dimethylformamide and dimethylacetamide.

The process of the invention is practised by effecting polymerization under the conditions usually employed in the preparation of poly (vinyl fluoride) except that 30–99 mol percent of vinyl fluoride and 70–1 mol percent of a monomer expressed by the Formula 1 above are co-present in a reaction system, and a free radical initiator is used as a catalyst. As the free radical initiator, any reaction initiator which forms a free radical is usable such as organic and inorganic peroxides, persulfates, azo compounds and ionizable radioactive rays. In view, however, of the difficulty of polymerizing vinyl fluoride with the monomer of the Formula 1, azo compounds and their derivatives, particularly their amidine salts, are most preferable. Water is used as a reaction medium, and if desired, an emulsifying agent may be added to it. The polymerization pressure is not less than 50 kg./cm.$^2$, and the polymerization temperature is in the range of 40 to 120° C.

Now, the invention will be described by examples, in which all parts are by weight.

Examples 1–3 and Referential Examples 1–4

A one-liter stainless steel autoclave equipped with a magnetic stirrer was charged with 500 parts of deaerated pure water and one part of α,α'-azobis(isobutyroamidine hydrochloride). The inside of the autoclave was completely deaerated, and 320 parts of vinyl fluoride and 69 parts of vinylidene fluoride were added. The temperature was raised to 80° C., and the reaction was effected while stirring the reaction mixture. During this time, the pressure was maintained at about 350 kg./cm.$^2$. When the pressure decreased to 305 kg./cm.$^2$ in about 20 minutes, the reaction was terminated. A gaseous mixture consisting of unreacted vinyl fluoride and vinylidene fluoride was discharged. The resulting polymer was washed with water in a customary manner, and dried. About 30 parts of a white powdery polymer was obtained.

The melting temperature and decomposition temperature of the obtained polymer were measured at a temperature rising rate of 20° C./min. by means of a differential thermal analyzer (model DT–10, product of Shimazu Seisaku Sho, Japan), and were found to be 195° C. and 281° C., respectively. The elemental analysis with respect to carbon and hydrogen revealed that the ratio of vinylidene fluoride in the copolymer was 3 mol. percent.

By the same procedures as mentioned above, polymerization was effected with varying ratios of vinyl fluoride to vinylidene fluoride, reaction temperatures and concentrations of the reaction initiator. The results are shown in Table 1. Examples of homopolymers of vinyl fluoride and vinylidene fluoride are given in Table 1 as Referential Examples 3 and 4, Referential Examples 1 and 2 show the cases wherein the amount of vinylidene fluoride in the copolymer is outside the range of the invention.

TABLE 1

| | Amount charged of monomers (part) | | Amount of catalyst (parts) | Pressure at the start of reaction→ termination of reaction (kg./cm.$^2$) | Yield of polymer (parts) | Ratio of vinylidene fluoride in the polymer (mol percent) | Melting temperature of polymer (° C.) | Decomposition temperature of polymer (° C.) |
|---|---|---|---|---|---|---|---|---|
| | Vinyl fluoride | Vinylidene fluoride | | | | | | |
| Examples: | | | | | | | | |
| 1 | 320 | 69 | 0.1 | 350→305 | 30 | 3 | 195 | 281 |
| 2 | 228 | 195 | 0.1 | 300→280 | 25 | 10 | 180 | 304 |
| 3 | 158 | 290 | 0.1 | 345→300 | 30 | 20 | 170 | 326 |
| Referential examples: | | | | | | | | |
| 1 | 81 | 400 | 0.3 | 370→300 | 45 | 41 | 168 | 353 |
| 2 | 19 | 490 | 0.8 | 375→330 | 45 | 72 | 172 | 392 |
| 3 | 370 | 0 | 0.01 | 350→300 | 40 | 0 | 200 | 240 |
| 4 | 0 | 510 | 20 | 400→365 | 35 | 100 | 187 | 425 |

Examples 4–8 and referential Examples 5–8

A one-liter stainless steel autoclave equipped with a magnetic stirrer was charged with 500 parts of deaerated pure water and one part of α,α'-azobis(isobutyroamidine hydrochloride). The inside of the autoclave was completely deaerated, and 184 parts of vinyl fluoride and 17 parts of trifluoroethylene were added. The temperature was raised to 80° C., and the reaction was effected while stirring the reaction mixture. During this time, the pressure was maintained at about 100 kg./cm.$^2$. When the pressure decreased to 80 kg./cm.$^2$ in about 20 minutes, the reaction was terminated. A gaseous mixture consisting of unreacted vinyl fluoride and trifluoroethylene was discharged. The resulting polymer was washed with water in a customary manner, and dried. About 30 parts of a white powdery polymer was obtained.

The melting temperature and decomposition temperature of the obtained polymer were measured at a temperature rising rate of 20° C./min. by means of a differential thermal analyzer (model DT–10, product of Shimazu Seisaku Sho, Japan), and were found to be 198° C. and 260° C., respectively. The elemental analysis by a combustion method with respect to carbon and hydrogen revealed that the ratio of trifluoroethylene in the copolymer was 21 mol percent.

By the same procedure as mentioned above, polymerization was effected with varying ratios of vinyl fluoride to trifluoroethylene, reaction temperatures and concentrations of the reaction initiator. The results are shown in Table 2. Examples of homopolymers of vinyl fluoride and trifluoroethylene are given in Table 2 as referential Examples 7 and 8, referential Examples 5 and 6 show the cases wherein the amount of trifluoroethylene in the copolymer is outside the range of the invention.

TABLE 2

| | Amount charged of monomers (part) | | Amount of catalyst (parts) | Pressure at the start of reaction → termination of reaction (kg./cm.$^2$) | Yield of polymer (parts) | Ratio of trifluoroethylene in the polymer (mol percent) | Melting temperature of polymer (° C.) | Decomposition temperature of polymer (° C.) |
|---|---|---|---|---|---|---|---|---|
| | Vinyl fluoride | Trifluoroethylene | | | | | | |
| Examples: | | | | | | | | |
| 4 | 184 | 17 | 0.1 | 100→80 | 30 | 21 | 198 | 260 |
| 5 | 170 | 3 | 0.1 | 100→80 | 25 | 7 | 199 | 245 |
| 6 | 150 | 40 | 0.1 | 89→80 | 25 | 14.2 | 193 | 299 |
| 7 | 128 | 145 | 0.1 | 95→82 | 28 | 35 | 192 | 307 |
| 8 | 80 | 150 | 0.1 | 80→65 | 30 | 50.1 | 189 | 311 |
| Referential examples: | | | | | | | | |
| 5 | 107 | 326 | 0.1 | 200→190 | 29 | 65 | 191 | 310 |
| 6 | 46 | 210 | 0.1 | 89→70 | 33 | 74 | 187 | 312 |
| 7 | 370 | 0 | 0.01 | 350→300 | 45 | 0 | 200 | 240 |
| 8 | 0 | 320 | 0.5 | 80→70 | 40 | 1.00 | 185 | 313 |

We claim:
1. A vinyl fluoride-trifluoroethylene copolymer with maximum differential between melting temperature and decomposition temperature per unit of trifluoroethylene produced by reacting 70 to 90 mol percent of vinyl fluo- ride with 30 to 10% trifluoroethylene in the presence of a free radical initiator, at pressures greater than about 50 kg./cm.$^2$ and a temperature between about 40° to 120° C.

References Cited

UNITED STATES PATENTS 2,419,009  11/1943  Coffman et al. _____ 260—87.5
2,468,054  4/1949  Ford _____ 260—87.7
3,022,278  2/1962  Culfee _____ 260—87.7

JOSEPH L. SCHOFER, Primary Examiner

JOHN KIGHT III, Assistant Examiner

U.S. Cl. X.R.

260—87.7